United States Patent [19]
Barish

[11] 3,871,248
[45] Mar. 18, 1975

[54] TWO-POWER-PATH BEVEL GEARING FOR HIGH LOADS AND HIGH SPEEDS

[76] Inventor: Thomas Barish, 5411 Tyrone Ave., Van Nuys, Calif. 91401

[22] Filed: Aug. 13, 1974

[21] Appl. No.: 496,922

[52] U.S. Cl. ............... 74/665 P, 74/410, 74/417
[51] Int. Cl. ..... F16h 37/06, F16h 57/00, F16h 1/14
[58] Field of Search ........ 74/665 P, 665 GB, 665 C, 74/417, 410

[56] References Cited
UNITED STATES PATENTS
2,552,864  5/1951  Piasecki.......................... 74/665 GB
FOREIGN PATENTS OR APPLICATIONS
1,079,079  8/1967  Great Britain..................... 74/665 P Primary Examiner—Leonard H. Gerin
Attorney, Agent, or Firm—Allan M. Shapiro

[57] ABSTRACT

Two power paths through bevel gearing which is operating near its upper limit of speed and load permit reduction in gear size, weight and speed. In such gearing, load is equalized between two power paths by mounting opposed bevel pinions on the same shaft and permitting axial float for balancing of thrust loading. By this means, torque loading is equalized in the two paths, and the technologically difficult high speed ball thrust bearing is eliminated.

15 Claims, 7 Drawing Figures

PATENTED MAR 18 1975 3,871,248

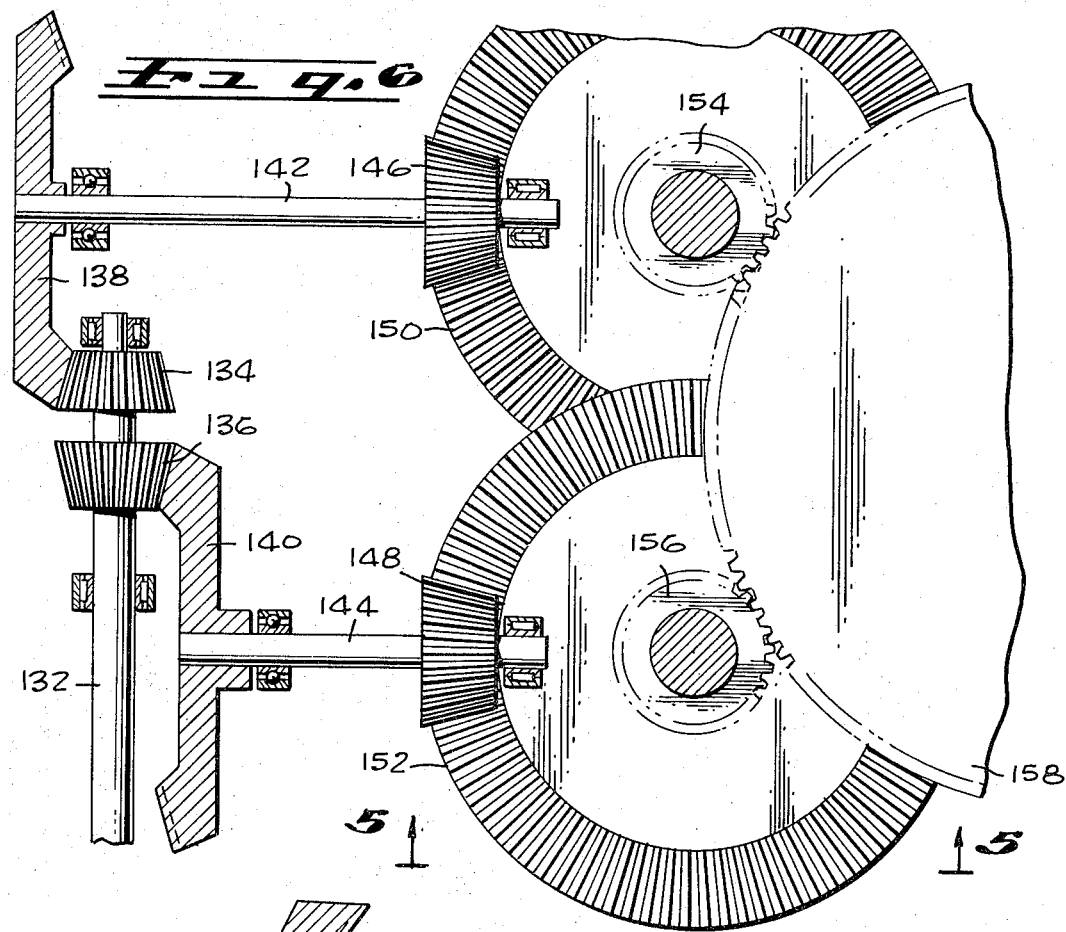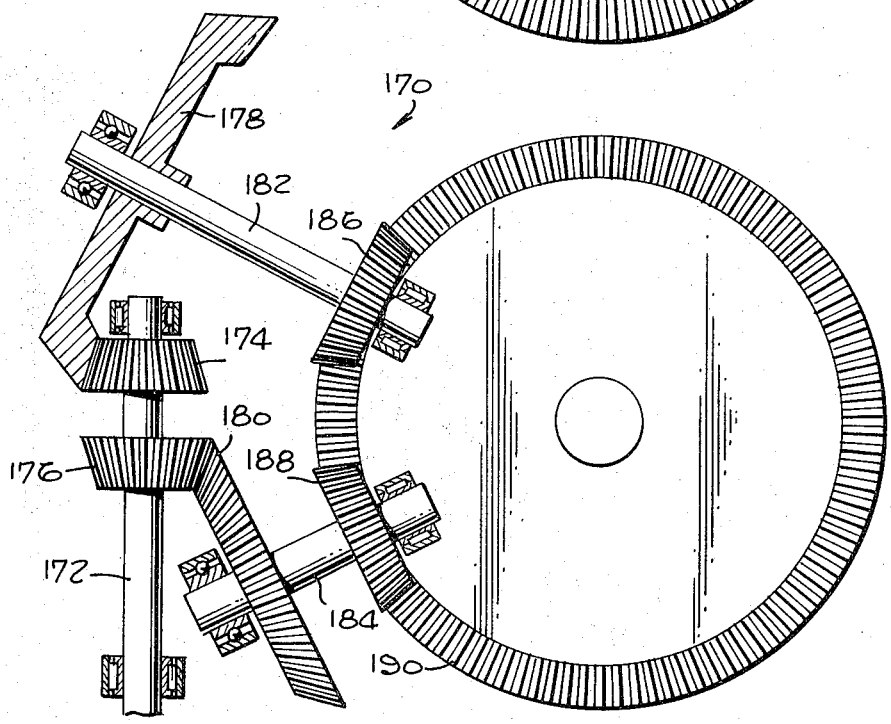

TWO-POWER-PATH BEVEL GEARING FOR HIGH LOADS AND HIGH SPEEDS

BACKGROUND OF THE INVENTION

1. Field of the Invention

This invention is directed to a bevel gear train designed for high loads and high speeds, with two power paths to divide the load and means for equalizing the load in the two power paths.

2. Description of the Prior Art

Only in the largest gear sets, especially those which have a large gear reduction ratio, have multiple power paths been employed. Traditionally, multiple power paths have been used in ship propulsion to reduce steam turbine rotational speeds down to propeller shaft speeds. Recently, gas turbine marine power plants have also required major speed reductions. Multiple power paths were employed to limit the face width of the bull gears, because the physical size and weight of the final drive bull gear became so large that handling and accurate tooth cutting became difficult. Pinion bending under load across the wide face of a bull gear also caused drive inaccuracy and resultant heat and noise. Thus, multiple pinions were employed around the periphery to reduce tooth loading at any one pinion, and to permit the load to be shared between the pinions. However, in such structures it was necessary that the load be carefully divided between the pinions, or the desired result would not be achieved.

The background also includes the gear structures which reduce the speed of a gas turbine to that of the rotating lift mast on a helicopter. In helicopters, the mast is necessarily upright, while the turbine is usually horizontal. Therefore, bevel gearing has been used. Usually a helicopter requires three gear reductions in order to obtain the necessary overall ratio.

Double-helical or herringbone gears have been employed in some applications to obtain equal and opposite thrust reactions, with one member of the gearset capable of axial float. However, such gears are not suitable in the structures to which the present invention is directed.

SUMMARY OF THE INVENTION

In order to aid in the understanding of this invention, it can be stated in essentially summary form that it is directed to a two-power-path bevel gear train for high loads and high speeds. The two-path bevel gearing includes a pair of opposed bevel pinions both fixed to the same shaft and floating between associated bevel gears so that axial force balance is achieved.

When gearing is designed and operated for approaching the upper limits of speed and load intensity, multiple power paths can divide the loads. For even a substantial portion of the range below the maximum limits of speed and load, dividing the load between two or more paths permits a decrease in gear size by about a quarter and a reduction in the gear tooth contact velocity. This permits carrying larger tooth loads, but it also provides a structure which produces far less noise proportionally than the one-quarter proportional reduction in pitch line speed. The dividing of the load into two paths also permits a considerable reduction in weight, since the large output gear has half as large a tooth load with a two pinion input thereto and thus the output gear can be reduced about one quarter in diameter. The reduction in size is sometimes very useful, and the reduction in weight is especially important in aircraft applications. The preferred utilization of the multiple path bevel gearing of this invention is in helicopter applications, because high loads and high speeds are achieved in those structures with a maximization of performance and a desired reliability with elimination of the high speed ball thrust bearing.

A two-power-path bevel gearing structure for high loads and high speeds is particularly applicable to the turbine driven helicopters especially in the modern larger sizes. Bevel gears are necessary, since the turbine is invariably horizontally mounted and the driven motor mast is vertical. In such applications, dividing the load reduces weight, size and increases reliability.

The major problem in dividing the load accurately among two or more power paths is critical because the actual deflection of gear teeth is very small. Mechanically, with just a few thousandths of an inch difference, even in large gears, a great difference in loading is taken along the two paths. Thus, with a relatively small error in manufacture, in assembly, or due to thermal changes in use, the whole load can easily be thrown into one power path. When minimization is achieved by designing for half a load, this cannot be tolerated. This invention is directed to the division of load along two power paths by providing floating back-to-back bevel pinions. These are arranged so that their axial thrust is the same for the desired power division, and the gears are mounted for axial floating so that the axial thrust automatically becomes balanced and torque load is equalized.

It is thus the object of this invention to provide a bevel gearing structure wherein load equalization is achieved along two power paths. It is another object to provide floating back-to-back bevel gears on the same shaft so that the thrust of one is balanced by the thrust of the other whereby thrust unbalance results in axial shifting of both the gears to balance thrust loads and thus balance torque loads. It is a further object to provide a two-power-path bevel gearing gear box for helicopters and like structures wherein division of torque loading between the two power paths is automatically and accurately achieved. It is a further object to provide an economic structure of maximum reliability by the accomplishment of equalization of torque loading to eliminate overloads in either path by path power unbalance.

The features of the present invention which are believed to be novel are set forth with particularity in the appended claims. The present invention, both as to its organization and manner of operation, together with further objects and advantages thereof, may be understood best by reference to the following description taken in connection with the accompanying drawings.

BRIEF DESCRIPTION OF THE DRAWINGS

FIG. 6 is a top plan view of the third preferred embodiment of the two-power-path bevel gearing of this invention, with parts broken away and parts taken in section.

FIG. 7 is a plan view of the fourth preferred embodiment of the two-power-path bevel gearing of this invention, with parts broken away and parts taken in section.

DESCRIPTION OF THE PREFERRED EMBODIMENT

Figure 1:
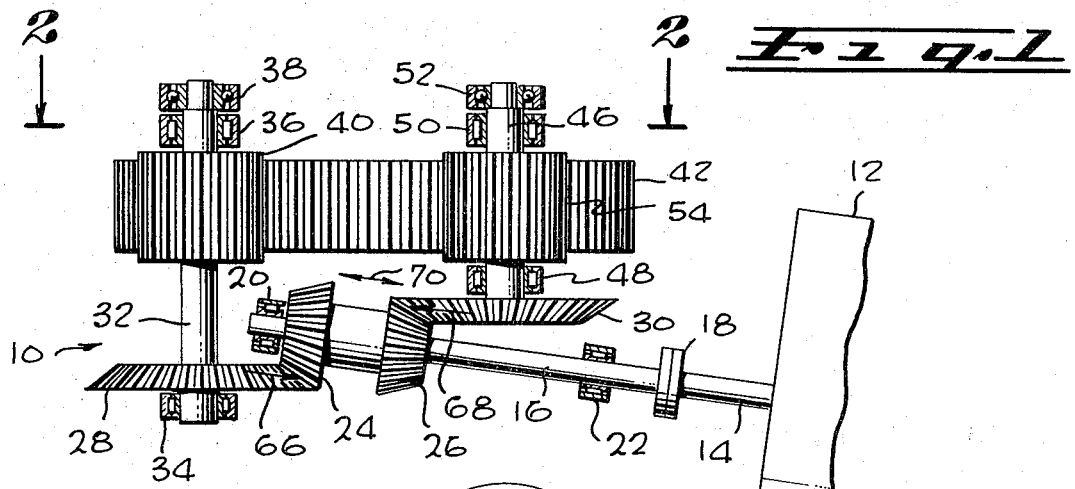
FIG. 1 is a side elevational view, with parts broken away and parts taken in section of the first preferred embodiment of the two-power-path bevel gearing of this invention.
Figure 2:
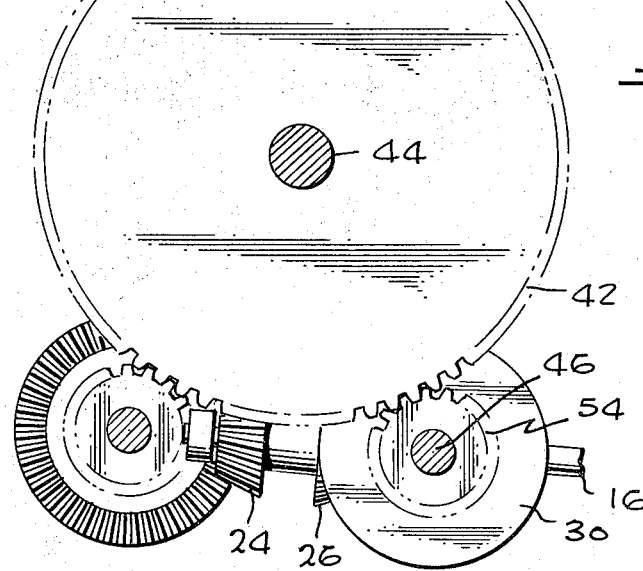
FIG. 2 is a plan view of the bevel gearing of FIG. 1, as seen substantially along the line 2—2 of FIG. 1.

The first preferred embodiment of the two-power-path bevel gearing is generally indicated at 10 in FIGS. 1 and 2. Turbine 12 has an output shaft 14 which drives pinion shaft 16 through coupling 18. Coupling 18 is of such nature as to transmit torque, but to permit the pinion shaft 16 to be axially free. Roller bearings 20 and 22 are of such nature as to provide radial support, but permit axial motion of pinion shaft 16. Bevel pinions 24 and 26 are fixed to shaft 16 and respectively engage bevel gears 28 and 30. The bevel pinions and gears are preferably spiral bevel gears, but straight bevel and curvic bevel gears are also applicable.

Bevel gear 28 is fixed to shaft 32 which is carried on roller bearings 34 and 36 for radial support and ball bearing 38 for the carrying of thrust loads. Pinion 40 is fixed to shaft 32 and mates with gear 42 which rotates on the axis of shaft 44.

Similarly, gear 30 is fixed to shaft 46 which is mounted on roller bearings 48 and 50 for radial loads and ball bearing 52 for axial loads. Pinion 54 is fixed to shaft 46 and also mates with gear 42 to provide the second power path between pinion shaft 16 and gear 42. The usual gear ratio found in turbine driven helicopters requires three gear reductions. In the present case, two gear reductions are achieved, and the third reduction can be achieved directly on the mast axis by planetary gearing.

Thus, the defined structure provides two power paths from shaft 16 to gear 42. One power path is from shaft 16 through pinion 24, gear 28, shaft 32, and pinion 40 to gear 42, while the other path is from shaft 16, through pinion 26, gear 30, shaft 46, and pinion 54 to main gear 42. Shaft 16 is mounted for free axial motion. The free axial or end-wise floating of the shaft is such that, if there is more torque between one bevel pinion and its mating gear than the other bevel pinion and its mating gear, then the axial forces are unbalanced, the bevel pinions axially shift until the higher load is reduced and the lesser load increases until the torque loads are exactly equal. The bevel pinions are identified so that the thrust-to-torque relationship is the same in both pinions. In assembly, it would be necessary to initially index the two pinions within broad limits for load equilization, but the final equalization would be achieved by axial floating of the bevel pinions. The amount of axial flotation in a gear box of this nature designed for a large turbine driven helicopter is calculated to have a maximum axial float in the range of 0.015 to 0.030 inch. This would be enough to overcome normal manufacturing and environmental differences to completely equalize the load in use.

In FIG. 1, arrow 66 indicates the axial thrust from bevel gear 28 onto bevel pinion 24, while arrow 68 indicates the axial thrust from bevel gear 30 onto bevel pinion 26. Shaft 16 axially floats, as indicated by arrow 70, to equalize these thrusts, and when the thrust is equalized due to gear design, the torque is equalized.

Bevel gears 28 and 30 are mounted on the opposite side of the axis of shaft 16 to permit the two pinions 40 and 54 to rotate in the same directions. Another feature of this particular design is that each pair of bevel gears and bevel pinions is exactly interchangeable. Thus, with the same torque, they automatically have equal and opposed thrust loads which balance out and permit the elimination of the thrust bearing. If there are unusual requirements for bevel angle that do not permit the gears to be interchangeable, then the design of the gear tooth must be adjusted in diameter, or spiral angle, or tooth pressure angle so that the thrust load of one is equal to the thrust load of the other when they are both delivering the same power. The particular design of FIGS. 1 and 2 is arranged for conventional turbine practice. For example, the turbine has its front end higher than the rear, but this could be adjusted by shifting the design position of bevel gears 28 and 30 so that they are farther apart. Also, as in common practice, the front end of the turbine is toed in. The angle of toe-in can be varied by the position of the spur pinions 40 and 54 around the center of mast gear 42. One of the appreciable advantages of this construction is the elimination of the thrust bearing on the high speed bevel pinion. This bearing is critical in many designs, especially because of the high centrifugal force on the balls in the thrust bearing. It is that bearing which is often the critical point in the reliability of the turbine gear box.

There may be a desirable application of a thrust bearing on shaft 16, which thrust bearing would not be effective until beyond the normal float of shaft 16. In abnormal operational conditions, such a thrust bearing might occasionally be helpful. For example, if pinion 26 or anything along its power path, or alternatively pinion 24 or anything along its power path were destroyed, by internal failure or external cause, a thrust bearing would permit operation of the other power path at half torque of turbine 12. In a helicopter, this would permit the helicopter to make a safe landing. Such a failure could occur by having a bullet strike into a gear mesh or the like.

As is seen in FIG. 2, the two-power-path bevel gearing 10 in the lower part of FIG. 2 is capable of being duplicated, for installations where two turbines drive a single mast. In the upper part of FIG. 2, pinion shaft 56 carries bevel pinion 58 engaging bevel gear 60 which in turn drives pinion 62 in engagement with gear 42. This structure corresponds to bevel pinion 24, bevel gear 28 and pinion 40. There is an opposed bevel pinion (hidden from view) opposing pinion 58, the same way bevel pinion 26 opposes bevel pinion 24. The two axially oppose each other and float to divide the torque loads between bevel gear 60 and bevel gear 64. Bevel gear 64 drives pinion 66 which is also in engagement with gear 42. Thus, two turbines each have two power paths whereby the load is equalized by floating bevel pinions.

Figure 3:
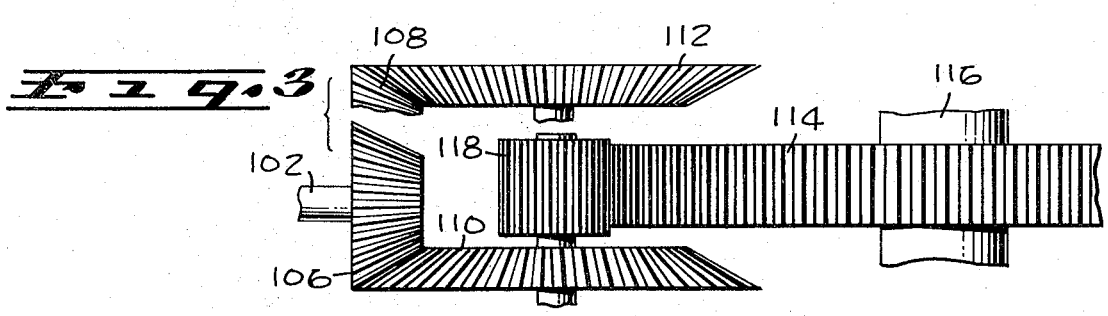
FIG. 3 is a fragmentary side elevational view as seen substantially along the line 3—3 of FIG. 4 of the second preferred embodiment of the two-power-path bevel gearing of this invention.
Figure 4:
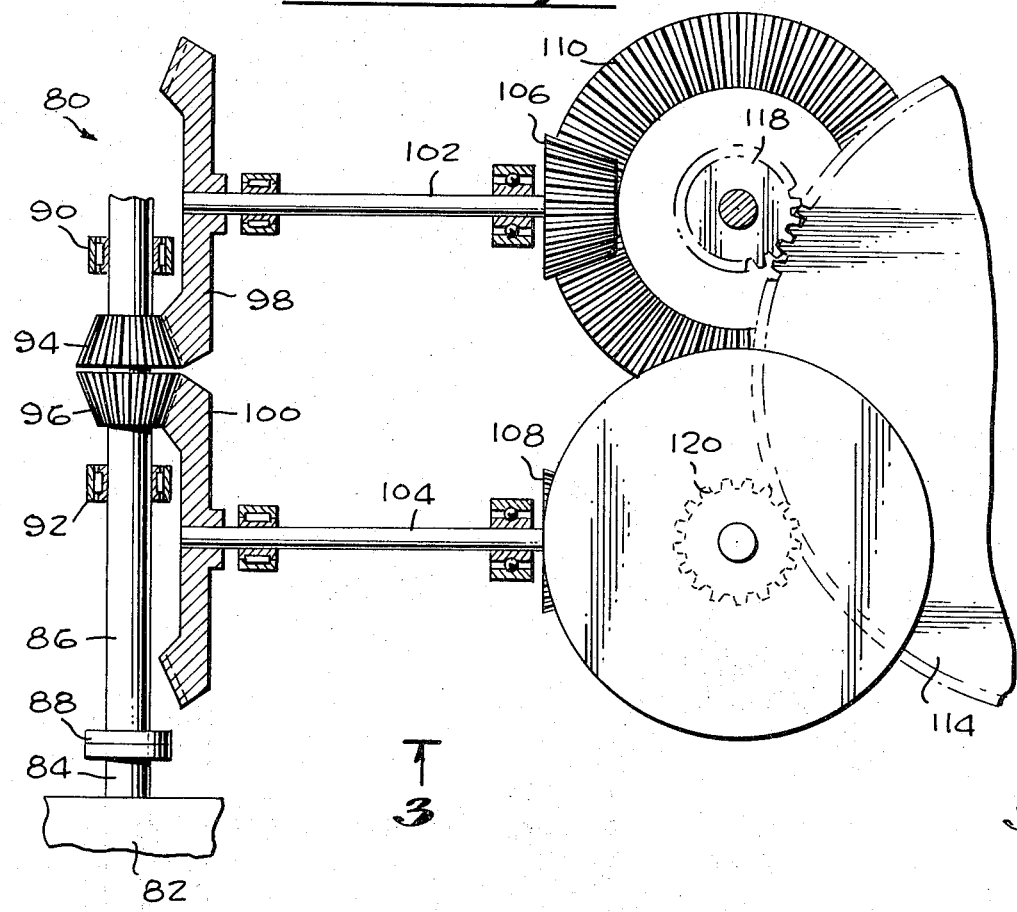
FIG. 4 is a top plan view of the second preferred embodiment of the two-power-path bevel gearing of this invention, with parts broken away and parts taken in section.

FIGS. 3 and 4 generally indicate another preferred embodiment of two-power-path bevel gearing, generally indicated at 80. Again, the structure can be duplicated for two turbine drives, but only a single turbine 82 is shown for convenience. Turbine 82 drives turbine shaft 84 which in turn drives pinion shaft 86 through coupling 88. Coupling 88 transmits torque but no substantial axial load, and pinion shaft bearings 90 and 92 support radial loads but are axially free. Bevel pinions 94 and 96 are both fixed back-to-back on pinion shaft 86 and are on the same side of their mating bevel gears 98 and 100, as compared to being on opposite sides of bevel gears 28 and 30 in FIG. 1. Such construction is desirable in those designs where the air for the turbine inlet goes around the gear box and it is desirable to minimize the profile or cross section of the gear box which blocks part of the air flow passage.

With this arrangement, the cross shafts 102 and 104 driven by respective bevel gears 98 and 100 rotate in opposite directions as indicated by their rotational arrows. The gear train thus requires structure which permits them to both mesh with the main center gear. This is accomplished by providing bevel pinions 106 and 108 respectively meshed with bevel gears 110 and 112. Bevel gear 112 is above main center gear 114 on mast 116 while bevel gear 110 is below the main center gear. These bevel gears respectively drive pinions 118 and 120 which mate with the main center gear to rotate it. One of the advantages of this structure is that, when two turbines are employed, their spacing can be controlled by the length of the cross shafts 102 and 104. If the physical position of the turbines on the air frame are fixed by other design considerations, the length of the cross shafts can be designed to suit the gear box. A further advantage of the two-power-path bevel gear train shown in FIGS. 3 and 4 is that the usual turbine driven helicopter installation requires a triple gear reduction, and in this illustrated structure the three gear reductions are accomplished with full power division along two power paths through all three reduction pairs. Thus, the main center gear 114 can directly drive the mast 116. Of course, as previously described, the axial float of bevel pinions 94 and 96 to accomplish axial thrust balance results in equalization of torque through the two paths.

Figure 5:
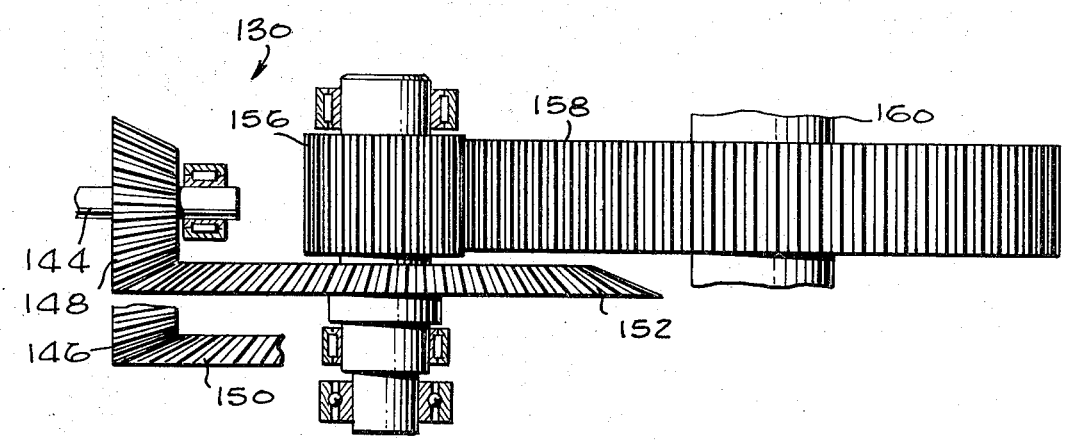
FIG. 5 is a fragmentary side elevational view as seen substantially along line 5—5 of FIG. 6 of the third preferred embodiment of the two-power-path bevel gearing of this invention, with parts broken away and parts taken in section.

The two-power-path bevel gear train 130 shown in FIGS. 5 and 6 shows another construction which permits the turbine shaft to be positioned farther away from the mast axis, but the bevel gears are on the opposite side of the floating pinion shaft. Floating pinion shaft 132 is radially constrained and axially floating. It carries bevel pinions 134 and 136 which are fixed to the shaft and are positioned for opposed thrusts. These bevel pinions respectively mate with bevel gears 138 and 140 which are fixed to cross shafts 142 and 144. Bevel pinions 146 and 148 are respectively fixed to these cross shafts and mate with bevel gears 150 and 152. These bevel gears in turn carry pinions 154 and 156 which both mate with main center gear 158 on mast 160. This gear train has the advantage of having the three reductions such as are conventionally required in turbine driven helicopters, together with full power division along the two paths by means of floating pinions. As previously described, the pinions 134 and 136 are designed so that equal and opposed axial thrust is the result of equal torque so that torques are automatically balanced through the two power paths.

The two-power-path bevel gear train 170 shown in FIG. 7 has pinion shaft 172 which has two back-to-back opposed bevel pinions 174 and 176 fixed thereto. Shaft 172 is radially constrained and is axially floating and is provided with drive torque from a suitable source such as a turbine. Bevel gears 178 and 180 are respectively mounted on shafts 182 and 184 and respectively mate with the bevel pinions 174 and 176. The bevel pinions are arranged so that equal torque provides equal axial thrust, and axial motion of the pinion shaft and bevel pinions in response to unbalance of axial force results in changes in transmitted torque so that gear torques are equalized, as described before. Thus, load is equalized through the two paths which include shafts 182 and 184. Bevel pinions 186 and 188 are mounted on the respective shafts and mate with main gear 190. There are only two reductions in this structure, and thus main gear 190 can be connected to a planetary set if triple reduction is required. Main gear 190 is preferably on the mast axis, as is conventional practice. The structure of FIG. 7 is advantageous in permitting the turbine to be moved farther away from the mast axis than the structure in FIG. 1, but still retaining the short power path with only two gear pairs. The double power path with the accurately divided load is accomplished through the first two speed reductions, where the higher speeds are found. Thus, this structure also has design advantages together with the balance of load through the two power paths by axial shifting of the bevel pinions on the first shaft in the gear train.

While particular embodiments of the present invention have been known and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A plural power path bevel gear train comprising:
 a radially supported and axially free bevel pinion shaft for rotation by a prime mover;
 first and second bevel pinions fixed to said bevel pinion shaft in opposed relationship for initiating first and second power paths in said gear train; and
 first and second bevel gears respectively in said first and second power paths, said first and second bevel gears being respectively in tooth engagement with said first and second bevel pinions, said tooth engagement being such that the division of torque through said first and second power paths is a function of axial position of said pinion shaft and said first and second pinions thereon with respect to said first and second bevel gears, and the axial position of said pinion shaft is automatically controlled by the balance of axial thrust forces on said bevel pinions by said bevel gears produced by torque transmitted from said bevel pinions to said bevel gears.

2. The gear train of claim 1 including:
 first and second intermediate shafts, said first and second bevel gears being respectively mounted thereon; and
 gear means interconnecting said first and second intermediate shafts with a single main gear for the balanced transmission of power through the two power paths.

3. The gear train of claim 2 wherein:
said gear means includes first and second main pinions in gear tooth engagement with said main gear, and
said first and second intermediate shafts respectively drive said first and second main pinions.

4. The gear train of claim 3 wherein:
said first and second bevel gears are on the same side of said pinion shaft.

5. The gear train of claim 4 including:
said first and second intermediate shafts rotate in opposite directions;
first and second output bevel pinions respectively carried by said first and second shafts;
first and second output bevel gears respectively in gear tooth engagement with said first and second output bevel pinions, each of said output bevel gears carrying one of said main pinions in gear tooth engagement with said main gear, one of said output bevel gears having its main pinion on one side thereof and the other of said output bevel gears having its main pinion on the other side thereof so that both said main pinions drive said main gear in the same direction.

6. The gear train of claim 5 wherein:
said first and second intermediate shafts are parallel to each other and at right angles to said bevel pinion shaft.

7. The gear train of claim 3 wherein:
said first and second bevel gears are in engagement with said bevel pinions on opposite sides of said bevel pinion shaft.

8. The gear train of claim 7 wherein:
each of said paths includes a further gear reduction pair so each of said power paths has three gear pairs therein.

9. The gear train of claim 8 wherein:
said further gear reduction pair is a bevel pinion and bevel gear pair.

10. The gear train of claim 7 wherein:
said first and second intermediate shafts are parallel to each other.

11. The gear train of claim 10 wherein:
said first and second intermediate shafts are each at an acute angle with respect to said bevel pinion shaft.

12. The gear train of claim 10 wherein:
said first and second intermediate shafts are substantially at right angles to said bevel pinion shaft.

13. The gear train of claim 7 wherein:
said first and second intermediate shafts have axes which are directed to intersect with the axis of said main gear.

14. The gear train of claim 9 wherein:
said first and second intermediate shafts are parallel to each other.

15. The gear train of claim 14 wherein:
said first and second intermediate shafts are substantially at right angles to said bevel pinion shaft.

* * * * *